April 11, 1961   J. W. HIERONYMUS   2,978,815
JOURNAL-INSERTED SYPHON PIPE
Filed May 7, 1957
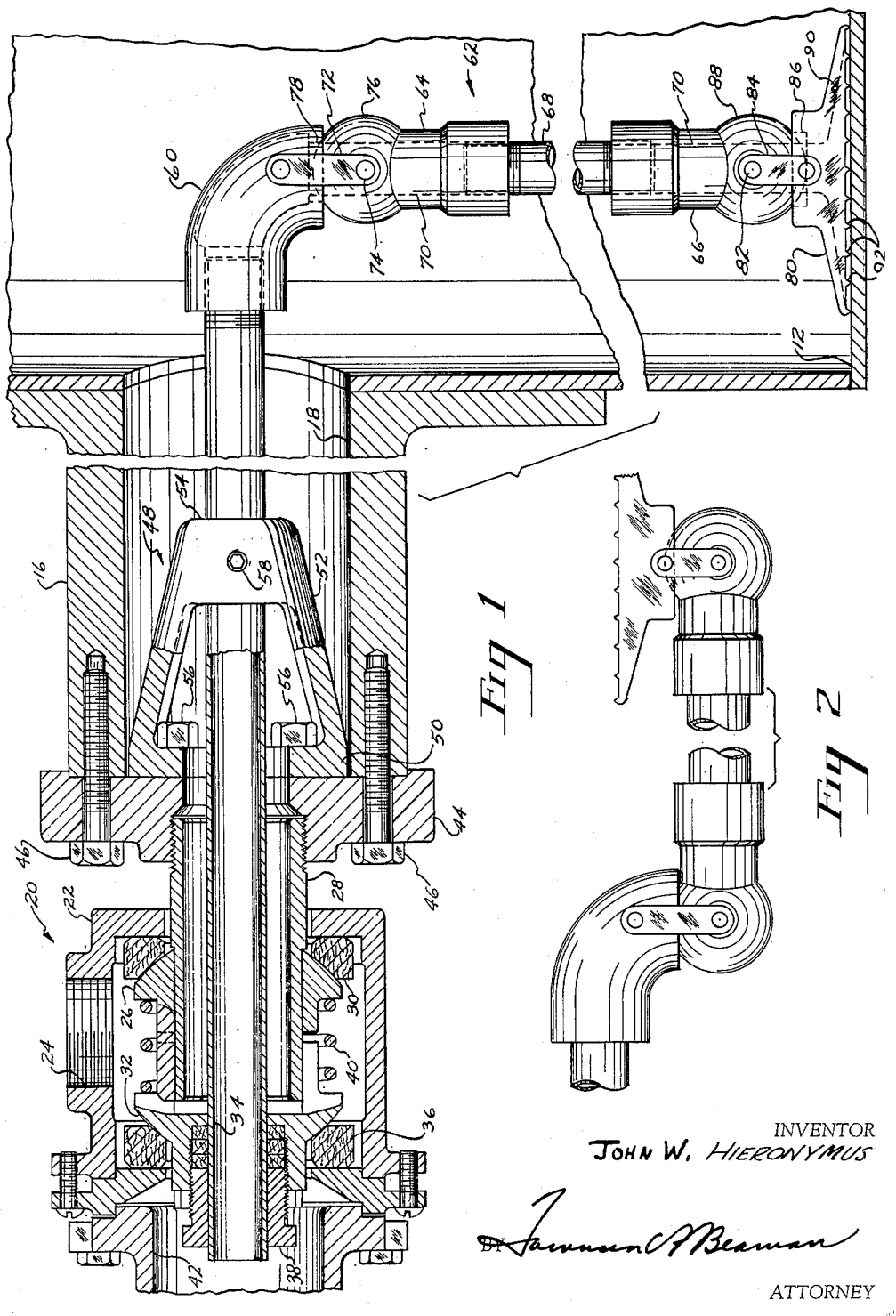
INVENTOR
JOHN W. HIERONYMUS
ATTORNEY United States Patent Office 2,978,815
Patented Apr. 11, 1961

2,978,815
JOURNAL-INSERTED SYPHON PIPE

John W. Hieronymus, Three Rivers, Mich., assignor to The Johnson Corporation, Three Rivers, Mich., a corporation of Michigan Filed May 7, 1957, Ser. No. 657,680

7 Claims. (Cl. 34—125)

The invention relates to a syphon pipe assembly for use with steam heated drying drums and particularly related to a syphon pipe which may be installed in existing drying drums without modification to the drums.

Increases in the demand for paper and paper products have necessitated an increase in the output of paper making machines. Increasing the output of existing machines by accelerating the operating speed has created several problems not present when the machines are operated at normal speeds. One of the more serious problems encountered occurs in the steam heated rotating drums or cylinders used to dry the paper. Originally, the condensate from the steam used to heat the drum would collect at the bottom of the drum and could be removed by a syphon pipe. However, when the drum rotates at higher speeds the condensate will be forced to the inside of the drum by centrifugal force and will not collect at the lower portions of the drum. Inasmuch as the condensate forms a film on the inner drum wall the condensate insulates the drum from the steam within, decreasing the efficiency of the heat transfer from steam to drum.

It is thus an object of the invention to produce a syphon pipe for use with a dryer drum which will rotate therewith and remove condensate held on the inner wall of the drum by centrifugal force.

A further object of the invention is to provide a syphon pipe for steam heated dryer drums which may be assembled to existing drums which have neither manhole nor handhold.

Another object of the invention is to design a syphon pipe which is capable of being inserted in a relatively confined space yet will automatically assume the desired shape once the pipe is within the dryer drum.

Yet another object of the invention is to provide a flexible syphon pipe which may be firmly held in contact with the inner wall of the drum.

These and other objects of the invention will become apparent when regarded with respect to the following description and accompanying drawing wherein: Fig. 1 discloses an elevational view, partly in cross-section, of the rotatable joint, drier drum and syphon pipe in assembled relation, and, Fig. 2 shows the syphon pipe assembly in its folded position adapted to be inserted into the drier drum.

The dryer drum 10 is of cylindrical configuration having shell 12 and end enclosures 14. The drum 10 is mounted for rotation on a pair of journals, one of which is hollow as shown at 16 in the drawing. A bore 18 is provided within the journal 16 and constitutes the only access into the interior of drum 10. The journals are mounted in suitable bearings, not shown, and means are provided to rotate the drum at the proper revolution per minute.

Steam is introduced into drum 10 by means of a self-aligning joint 20 which also provides the means for supporting a section of the syphon pipe as will be later apparent. Basically the joint 20 consists of a housing 22 in which a threaded inlet port 24 is formed. Within the housing 22 is a spherical faced seal 26 which is mounted on the joint nipple 28. The seal 26 engages the concave surface of an annular sealing ring 30 which also contacts the housing 22. A second spherical faced seal 32 is mounted upon the horizontal conduit 34 of the syphon pipe, engaging the sealing ring 36 and suffices to seal the left end of housing 22. A bushing 38 and conventional packing form a fluid tight connection between the seal 32 and conduit 34 while a helical spring 40, interposed between seals 26 and 36, will maintain the seals and rings in contact. Conduit 34 opens into the conduit 42 through which the condensate is carried away and port means are provided in seal 32 whereby steam introduced into housing 22 will flow into the joint nipple 28. Thus, the joint 20 serves to permit steam and condensate to be injected into and removed from the nipple 28 and conduit 34, respectively, while the drum 10 is rotating. Seals 26 and 32 and rings 30 and 36 prevent the steam from escaping into the atmosphere and the spherical faces permit the joint 20 to align itself upon the nipple 28 even though the nipple may rotate slightly off-center.

The joint nipple 28 is threaded into the adapter flange 44 which is affixed on the end of journal 16 by the bolts 46 thereby enclosing the base 18.

An important feature of the invention lies in the design of the spider 48 which is used to support the syphon pipe assembly. The spider 48 consists of a base 50, an open web 52 and support end 54. The base 50 is attached to the inner face of adapter flange 44 by bolts 56 and the support end 54 is bored to snugly receive the conduit 34. A set screw 58 may be tightened to bear against conduit 34 and prevent the pipe from longitudinal movement and, as will be observed from the drawing, both flange 44 and spider 48 are centrally bored oversize to permit the steam flowing through nipple 28 to enter the journal bore 18 and the interior of drum 10.

The vertical and flexible portion of the syphon pipe assembly is connected to the horizontal pipe 34 by the elbow 60 which is threaded onto the end of conduit 34. The flexible components of the vertical syphon pipe portion 62 consist of a pair of spherical ball and socket type joints 64 and 66 which are interconnected by the piping or conduit 68. The joints 64 and 66 are formed with a bore 70, concentric with the longitudinal axis of the joints, which opens onto the spherical surfaces. The conduit 68 threads into the joints 64 and 66 communicating with bores 70 whereby the condensate may flow through joint 66, conduit 68 and through joint 64.

The joint 64 is connected to the elbow 60 by a pair of links 72, affixed on opposite sides of elbow 60, which are pivotally connected to the joint 64 by pins 74. The pins 74 are pivoted on an axis through the center of the spherical surface 76 and perpendicular to the axes of bore 70 and 34. A socket 78 is formed in the elbow 60 into which the surface 76 is seated and as the links 72 are pivoted to joint 64 at the center of the surface 76 the joint will always seat in socket 78 irrespective of the angular relationship of joint 64 and elbow 60.

The condensate is picked up by syphon foot 80 which is pivotally attached to the joint 66 by the pivot pin 82 and links 84. The foot 80 is formed with an annular socket 86, seating the spherical surface 88 of the joint 66, which communicates with the conical cavity 90 open at the bottom of the foot. A plurality of projections 92 space the foot 80 from the drum shell 12 permitting the condensate to flow under the foot and into the cavity 90.

The syphon pipe assembly is inserted into and attached to the dryer drum 10 in the following manner:

Preferably, the self-aligning joint 20 is assembled to the nipple 28 and horizontal syphon pipe 34, as shown in the drawing, and the nipple 28 is threaded into the adapter flange 44. The spider 48 is bolted to the inside of flange 44 and the set screw 58 is tightened down on pipe 34. The conduit 68 is rotated about pivot pin 74 until the axis of conduit 68 is parallel to the axis of pipe 34 and extends to the right as viewed in the drawing. The syphon foot 80 is pivoted about pin 82 until the foot 80 is on top of the joint 66 with the plane of projections 92 parallel to the axes of conduits 34 and 68. The assembly is now in substantially linear relationship and may be inserted into the bore 18 of journal 16.

Once the conduit 68 is within the interior of drum 10 the weight of the joints 64 and 66, conduit 68 and foot 80 will swing the pipe section 62 into a vertical position about the pin 74 and the syphon foot 80 will pivot about pin 82 to the horizontal position shown in the drawing. During the above process the conduit 34 should be inclined to provide clearance for the foot 80 to swing freely.

The adapter flange may now be brought into contact with the end of the journal 16 and the bolts 46 tightened to connect the syphon pipe assembly to the dryer drum 10. To insure sealing of the joints 64 and 66 with the sockets 78 and 86 and to prevent the vertical portion 62 of the syphon pipe from shifting during rotation of drum 10, the length of conduit 68 is such that the distance from the inner wall of shell 12 to the axis of the horizontal threaded hole of elbow 60 is slightly greater than the distance from the inner wall to the axis of the drum 10. Thus, since flange 44 and spider 48 are concentric with the drum axis, the portion of pipe 34 between spider 48 and elbow 60 will be deflected from the drum axis and act as a spring to hold the syphon foot 80 in firm contact with the shell 12.

It will thus be understood that the invention discloses a syphon pipe assembly which may be used with dryer drums which have very limited access to the interior. The mounting of the spider 48 directly to an adapter flange 44 eliminated the conventional construction wherein the spider is affixed to the interior of the drum and hand holes had to be cut in the drum to perform the mounting of the spider. As the condensate forms on the inner wall of shell 12 the syphon foot 80 will drain off the condensate through joint 66, conduit 68, joint 64, elbow 60, conduit 34 and conduit 42. The design of foot 80 will determine the thickness of the film of condensate on the shell 12, the periphery of the foot 80 will be increased to decrease the thickness of condensate film.

The concepts of the invention are not limited to the illustrated embodiment and modification to the described construction may be apparent to those skilled in the art without departing from the spirit and scope of the invention.

I claim:

1. A syphon pipe assembly for use with a dryer drum having a hollow, open-end journal comprising, in combination, an annular flange attachable to the end of said hollow journal, a first conduit extending through said flange, means mounted on said flange supporting said conduit, a first flexible joint attached to said first conduit, a second conduit affixed to said flexible joint at one end in fluid communication with said first conduit through said first joint, a second flexible joint affixed to said second conduit at the other end and intake means connected to said second joint in fluid communication with said second conduit through said second joint adapted to engage the inside periphery of the drum.

2. A syphon pipe assembly for use with a dryer drum having a hollow, open-end journal comprising an annular flange attachable to the end of said journal concentric thereto, a spider affixed to said flange within said journal, a first rigid conduit extending concentrically through said flange, said conduit being supported in said spider, a second rigid conduit, a flexible conduit connection attached to each end of said second conduit, one of said flexible connections communicating with said first conduit and an intake affixed to the other of said connections whereby said intake is in fluid communication with said first conduit.

3. A rotating syphon pipe assembly for use with a dryer drum having a hollow, open-end journal comprising an annular flange attachable to the end of said journal, a spider affixed to said flange, a first conduit extending concentrically through said flange and supported by said spider, an annular socket seat communicating with said first conduit, a second conduit pivotally affixed to said first conduit, a spherical surfaced joint mounted on one end of said second conduit engaging said socket seat in fluid communication therewith, intake means adapted to engage the inside periphery of the drum pivotally affixed to the other end of said second conduit and an annular socket seat formed in said intake means in fluid communication with a spherical surfaced joint on said second conduit.

4. A rotatable syphon pipe assembly for use with a dryer drum having a hollow, open-end journal comprising an annular flange attachable to the end of said journal concentrically thereto, a spider concentrically affixed to said flange, a first conduit extending into said drum through said flange and supported by said spider, a second conduit within said drum, a flexible joint pivotally connecting said second conduit to the inner end of said first conduit in fluid communication therewith, an intake foot connected to said second conduit and engaging the inside periphery of said drum, said second conduit being of sufficient length to deflect the inner end of said first conduit from the axis of said spider whereby said intake foot will be biased against the inside periphery of said drum.

5. A syphon pipe assembly for use with a dryer drum having a hollow, open-end journal comprising a flange attachable to the end of said journal concentric thereto, a spider affixed to said flange, a first conduit extending concentrically through said flange and supported by said spider, an elbow affixed to the inner end of said first conduit, an annular socket seat formed in said elbow, a pair of links pivotally supporting a spherical surfaced joint in engagement with said seat, a rigid second conduit attached at one end to said joint in fluid communication with said first conduit through said joint, a second spherical surfaced joint attached to the other end of said second conduit, an intake foot pivotally connected to said second joint by a pair of links and an annular socket seat formed in said foot engaging the spherical surface of said second joint establishing fluid communication between said foot and said second conduit.

6. A rotatable syphon pipe assembly for use with a dryer drum having a hollow, open-end journal comprising an annular flange attachable to the end of said journal concentrically thereto, a spider concentrically affixed to said flange, a first conduit extending into said drum through said flange and supported by said spider, a second conduit within said drum, a flexible joint pivotally connecting said second conduit to the inner end of said first conduit in fluid communication thereto, an intake foot connected to said second conduit and engaging the inside periphery of said drum, the inner end of said first conduit being deflected from the axis of said spider whereby the deflection of said first conduit biases said intake foot against the inside periphery of the drum.

7. A rotatable syphon pipe assembly for use with a dryer drum having a hollow, open-end journal, comprising an annular flange attachable to the end of said journal concentrically thereto, a spider concentrically affixed to said flange, a first conduit extending into said drum through said flange and supported by said spider, a second conduit within said drum, a flexible joint pivotally connecting said second conduit to the inner end of said first conduit in fluid communication thereto, and an intake foot affixed to said second conduit firmly engaging the inside periphery of said drum whereby relative movement between said foot and drum is prevented.

References Cited in the file of this patent

UNITED STATES PATENTS

| | | |
|---|---|---|
| 1,537,792 | Aucutt | May 12, 1925 |
| 1,953,525 | Young | Apr. 3, 1934 |
| 2,056,562 | Bridge | Oct. 6, 1936 |
| 2,299,530 | Cram | Oct. 20, 1942 |
| 2,617,205 | Cram | Nov. 11, 1952 |